(12) United States Patent
Bohanan et al.

(10) Patent No.: US 10,247,908 B2
(45) Date of Patent: Apr. 2, 2019

(54) ADJUSTABLE MIRROR BRACKET

(71) Applicant: Protomet Corporation, Oak Ridge, TN (US)

(72) Inventors: Jeff S. Bohanan, Powell, TN (US); Kevin R. Disney, Oak Ridge, TN (US); Dale L. Lambert, Oak Ridge, TN (US); William M. Reid, Knoxville, TN (US)

(*) Notice: Subject to any disclaimer, the term of this patent is extended or adjusted under 35 U.S.C. 154(b) by 0 days.

(21) Appl. No.: 15/281,618

(22) Filed: Sep. 30, 2016

(65) Prior Publication Data

US 2018/0001822 A1    Jan. 4, 2018

Related U.S. Application Data

(63) Continuation of application No. 15/200,078, filed on Jul. 1, 2016, now abandoned.

(51) Int. Cl.
*G02B 7/198*    (2006.01)
*B60R 1/078*    (2006.01)
*B60R 1/06*    (2006.01)
*B63B 35/00*    (2006.01)
*G02B 7/182*    (2006.01)
*B63B 17/00*    (2006.01)
*B63B 49/00*    (2006.01)

(52) U.S. Cl.
CPC ............... *G02B 7/198* (2013.01); *B60R 1/06* (2013.01); *B60R 1/078* (2013.01); *B63B 17/00* (2013.01); *B63B 35/00* (2013.01); *B63B 49/00* (2013.01); *G02B 7/1824* (2013.01)

(58) Field of Classification Search
CPC ...... G02B 7/198; G02B 7/182; G02B 7/1824; G02B 7/1825; B60R 1/02; B60R 1/0607; B60R 1/061; B60R 1/066; B60R 1/078
See application file for complete search history.

(56) References Cited

U.S. PATENT DOCUMENTS

| 564,454 A | 7/1896 | Ryan |
| 2,732,764 A | 1/1956 | Paiks |
| 3,376,644 A | 4/1968 | Alexander |

(Continued)

OTHER PUBLICATIONS

Nonfinal Office Action dated Apr. 22, 2014, in U.S. Appl. No. 13/627,539.

(Continued)

*Primary Examiner* — Darryl J Collins
*Assistant Examiner* — Journey F Sumlar
(74) *Attorney, Agent, or Firm* — Matthew M. Googe; Robinson IP Law, PLLC

(57) ABSTRACT

An adjustable mirror bracket is provided for supporting a mirror in a rearward facing position on a watercraft. The mirror bracket includes a base member having a body having a socket formed therein and a spherical bearing within the socket and including a stud projecting therefrom. The mirror bracket also includes a pivot member having a cupped lower end shaped to conform to the hemispherical top end of the base member, a bore formed through the cupped lower end for receiving the stud of the spherical bearing, and an attachment surface formed in an upper end of the pivot member. An elongate support arm is provided and is pivotally attached with a fastener to the attachment surface of the pivot member at the first end of the support arm.

13 Claims, 17 Drawing Sheets

(56) References Cited

U.S. PATENT DOCUMENTS

| | | | |
|---|---|---|---|
| 3,977,645 A | | 8/1976 | Deely |
| 4,111,532 A | * | 9/1978 | Budish .................. B60R 1/078 |
| | | | 248/481 |
| 4,244,548 A | * | 1/1981 | Sharp ...................... B60R 1/06 |
| | | | 248/481 |
| 5,100,093 A | | 3/1992 | Rawlinson |
| 5,259,582 A | | 11/1993 | DeLange, III |
| 5,419,522 A | | 5/1995 | Luecke et al. |
| 5,845,885 A | | 12/1998 | Carnevali |
| 6,581,892 B2 | | 6/2003 | Carnevali |
| 7,007,904 B2 | | 3/2006 | Schultz |
| 7,028,959 B2 | | 4/2006 | Schultz |
| 7,090,181 B2 | | 8/2006 | Biba et al. |
| D546,753 S | | 7/2007 | Schultz |
| 8,770,530 B2 | | 7/2014 | Bohanan et al. |
| D724,508 S | | 3/2015 | Bohanan et al. |
| D724,509 S | | 3/2015 | Bohanan et al. |
| 9,327,647 B2 | | 5/2016 | Milbank |
| 2014/0085739 A1 | | 3/2014 | Bohanan et al. |
| 2015/0183374 A1 | * | 7/2015 | Liu ........................ B60R 1/078 |
| | | | 359/865 |

OTHER PUBLICATIONS

Final Office Action dated Sep. 16, 2014, in U.S. Appl. No. 13/627,539.

* cited by examiner

ADJUSTABLE MIRROR BRACKET

CROSS-REFERENCE TO RELATED APPLICATION

This application is a continuation of U.S. patent application Ser. No. 15/200,078 for an Adjustable Mirror Bracket and filed on Jul. 1, 2016, the contents of which are incorporated herein by reference in its entirety.

FIELD

This disclosure relates to the field of mirror support brackets. More particularly, this disclosure relates to an adjustable mirror bracket for supporting a mirror on a watercraft.

BACKGROUND

Recreational watercraft frequently include one or more mirrors mounted near an operator of the watercraft such that the driver of the watercraft can view a water skier, wakeboarder, or wake surfer behind the watercraft. Placement of the mirror is important in that it should allow an operator of the watercraft to maintain a clear view of a person being towed by the watercraft while also placing the mirror in a position that does not obstruct a forward view of the watercraft operator.

To place the mirror in a desired position, attempts have been made to provide adjustable mirrors that include a hinge or other assembly to allow a mirror to pivot or otherwise adjust. However, these attempts provide limited adjustment of the mirror. Further, traditional pivots or hinges may reduce stability of the mirror resulting in shaking or movement of the mirror during operation of the watercraft, thereby making viewing of a person being towed by the watercraft difficult. Finally, mirrors that may provide adjustability include multiple visible fasteners and components that reduce an appearance of the mirror or support components.

What is needed, therefore, is an adjustable mirror bracket that provides adjustment of a rearward facing mirror along multiple axes and that supports a mirror in multiple positions.

SUMMARY

The above and other needs are met by an adjustable mirror bracket support for supporting a mirror in a rearward facing position. In one aspect, an adjustable mirror bracket is provided that includes a base member, a pivot member, and an elongate support arm having a first end and a second end. The base member includes: a body having bottom end, a hemispherical top end, a socket formed in the body of the base member; a spherical bearing including a stud projecting therefrom, the spherical bearing shaped to fit within the socket of the lower base member and oriented such that the stud extends from a top end of the body; a pivot member including a cupped lower end shaped to conform to the hemispherical top end of the base member, a bore formed through the cupped lower end for receiving the stud of the spherical bearing, and an attachment surface formed in an upper end of the pivot member. The elongate support arm is pivotally attached with a fastener to the attachment surface of the pivot member at the first end of the support arm.

In one embodiment, the mirror bracket support includes a cavity formed in the attachment surface of the pivot member in communication with the bore formed through the cupped lower end of the pivot member, wherein the spherical bearing stud extends into the cavity. In another embodiment, the stud of the spherical bearing includes a keyed portion formed thereon, and wherein the pivot member includes a keyed recess formed on the cupped lower end for engaging the keyed portion of the stud. In yet another embodiment, the spherical bearing stud is threaded, and further comprising a nut inserted into the cavity for securing the pivot member to the base member in a desired orientation.

In one embodiment, the support arm is attached to the attachment surface of the pivot member, the first end of the support arm substantially conceals the cavity formed in the attachment surface of the pivot member. In another embodiment, the attachment surface and a surface of the first end of the support arm are serrated to substantially prevent the support arm from pivoting with respect to the pivot member.

In another embodiment, the mirror support bracket further includes a mirror attached to the second end of the elongate support arm. In yet another embodiment, the mirror is attached to the second end of the elongate support arm with a ball joint.

In one embodiment, the mirror support bracket further includes one or more mounting holes formed through the base member for securing the base member to a support surface.

In another embodiment, corresponding surfaces of the attachment surface of the pivot member and elongate support arm are serrated for substantially preventing rotation of the support arm relative to the pivot member when fastener of the support arm is substantially tightened.

In yet another embodiment, the pivot member has a hemispherical cross-sectional area, and wherein the attachment surface is formed along a flat back portion of the hemispherical pivot member.

In a second aspect, an adjustable mirror bracket is provided for supporting a mirror in a rearward facing position, the adjustable mirror bracket including a base member, a pivot member, and an elongate support arm having a first end and a second end. The base member includes: a body having bottom end, a hemispherical top end, a socket formed in the body of the base member; and a spherical bearing including a stud projecting therefrom, the spherical bearing shaped to fit within the socket of the lower base member and oriented such that the stud extends from a top end of the body. The pivot member includes: a cupped lower end shaped to conform to the hemispherical top end of the base member; a bore formed through the cupped lower end for receiving the stud of the spherical bearing; an attachment surface formed in an upper end of the pivot member; and a cavity formed in the attachment surface of the pivot member in communication with the bore formed through the cupped lower end of the pivot member, wherein the spherical bearing stud extends into the cavity. The elongate support arm is pivotally attached with a fastener to the attachment surface of the pivot member at the first end of the support arm.

In a third aspect, an adjustable mirror bracket is provided for supporting a mirror in a rearward facing position, the adjustable mirror bracket including a base member, a pivot member, an elongate support arm having a first end and a second end, and a mirror pivotally attached to the second end of the elongate support arm. The base member includes: a body having bottom end, a hemispherical top end, a socket formed in the body of the base member; and a spherical bearing including a stud projecting therefrom, the spherical bearing shaped to fit within the socket of the lower base member and oriented such that the stud extends from a top end of the body, the stud including a keyed portion formed thereon. The pivot member includes: a cupped lower end shaped to conform to the hemispherical top end of the base member, the lower end including a keyed recess formed on the cupped lower end for engaging the keyed portion of the stud; a bore formed through the cupped lower end for receiving the stud of the spherical bearing; an attachment surface formed in an upper end of the pivot member; and a cavity formed in the attachment surface of the pivot member in communication with the bore formed through the cupped lower end of the pivot member, wherein the spherical bearing stud extends into the cavity. The elongate support arm is pivotally attached with a fastener to the attachment surface of the pivot member at the first end of the support arm.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

An adjustable mirror bracket 10 is provided for attaching a rear-facing mirror to a watercraft. The adjustable mirror bracket supports the mirror in a position relative to an operator of the watercraft such that the operator may have a rearward view from the watercraft without obstructing the operator's forward-facing view. The adjustable mirror bracket 10 enables a user to adjust a position of a mirror supported by the bracket along multiple axes such that the mirror may be appropriately positioned on a variety of surfaces of a watercraft and in various orientations.

Figure 1:
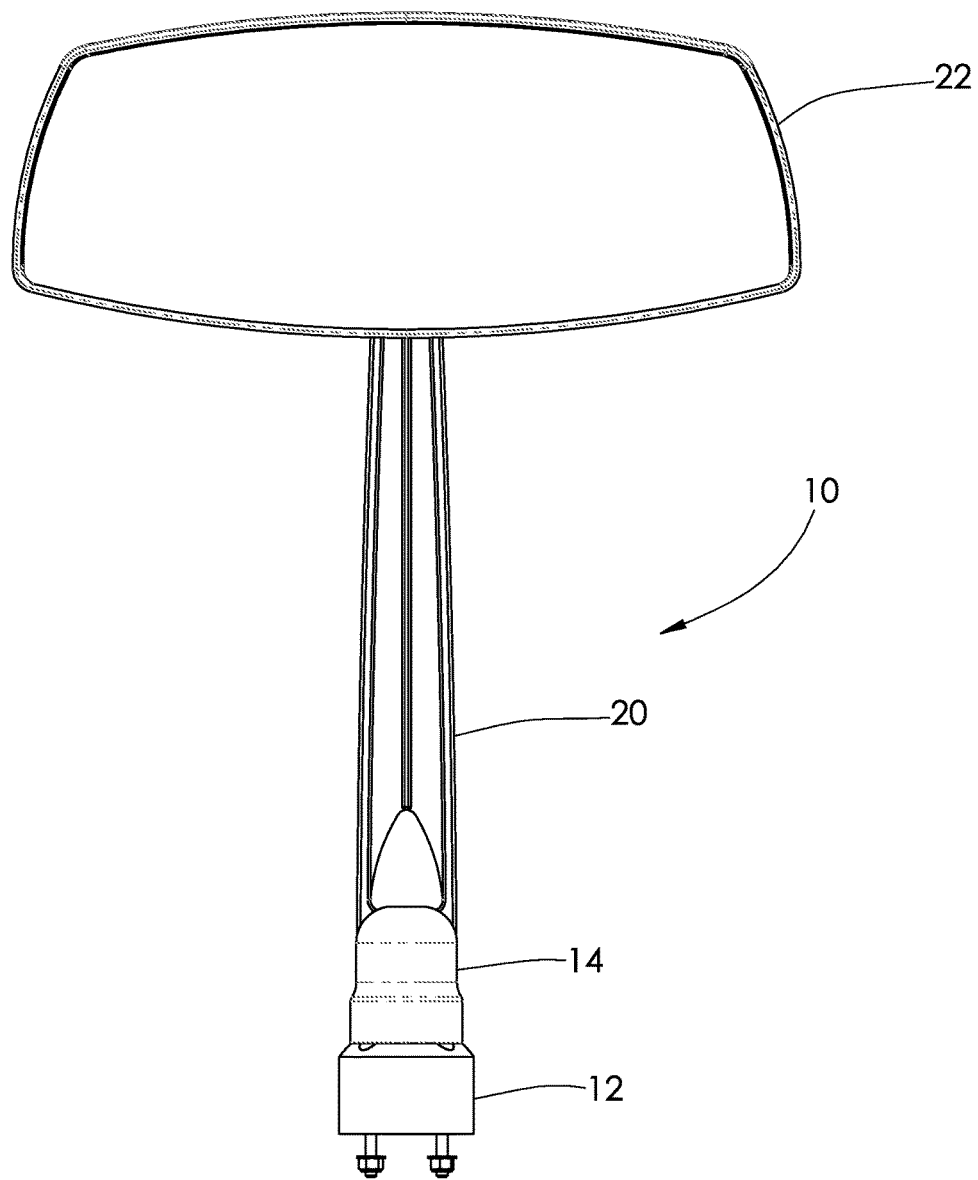
FIG. 1 shows an adjustable mirror bracket according to one embodiment of the present disclosure.
Figure 2:
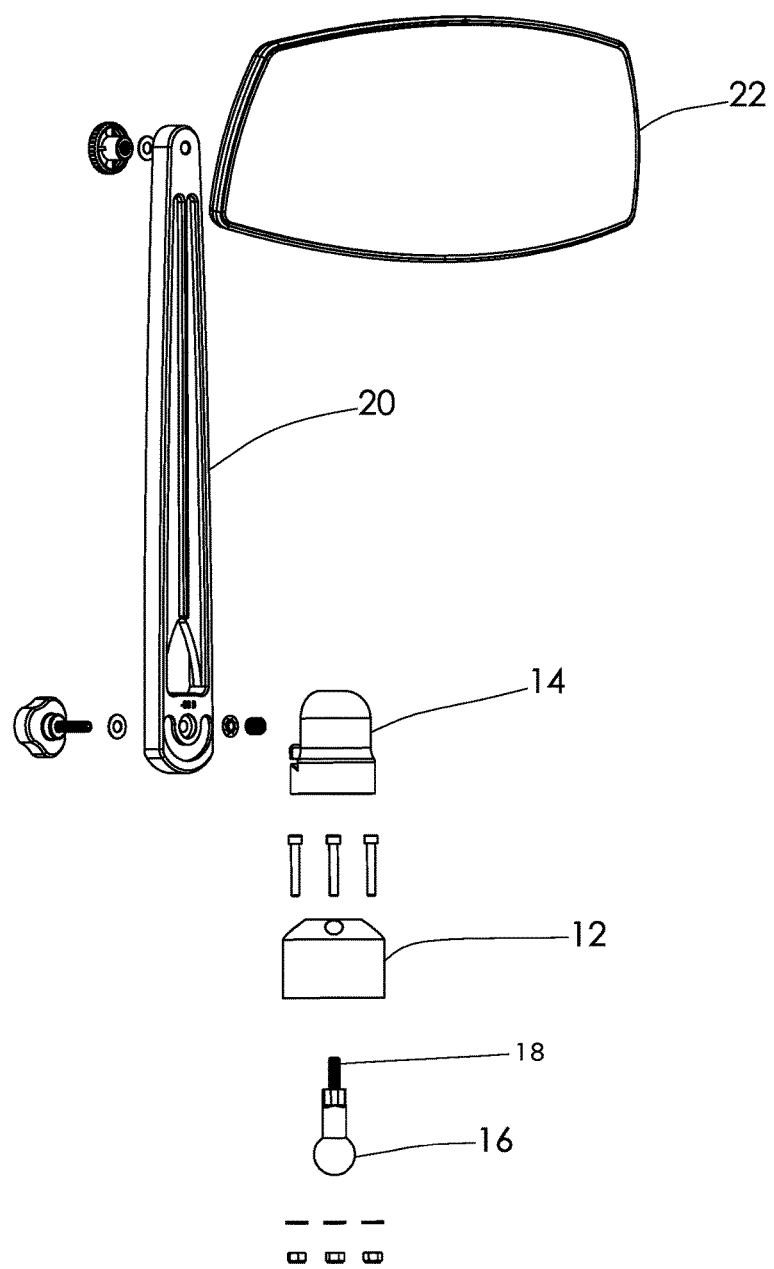
FIG. 2 shows an exploded view of an adjustable mirror bracket according to one embodiment of the present disclosure.

FIG. 1 shows a basic embodiment of the adjustable mirror bracket 10. The mirror bracket 10 includes a base member 12 and a pivot member 14 adjustably engaged with the base member 12. A spherical bearing 16 (FIG. 2) including a projecting stud 18 is at least partially disposed within base member 12 for attaching the pivot member 14 to the base member 12. An elongate support arm 20 is pivotally attached to the pivot member 14 at one end, and a mirror 22 is attached at a second end of the elongate support arm 20. The adjustable mirror bracket 10 enables multi-axis and multi-plane adjustment of the mirror 22 with respect to a surface on which the adjustable mirror bracket 10 is mounted.

Figure 3:
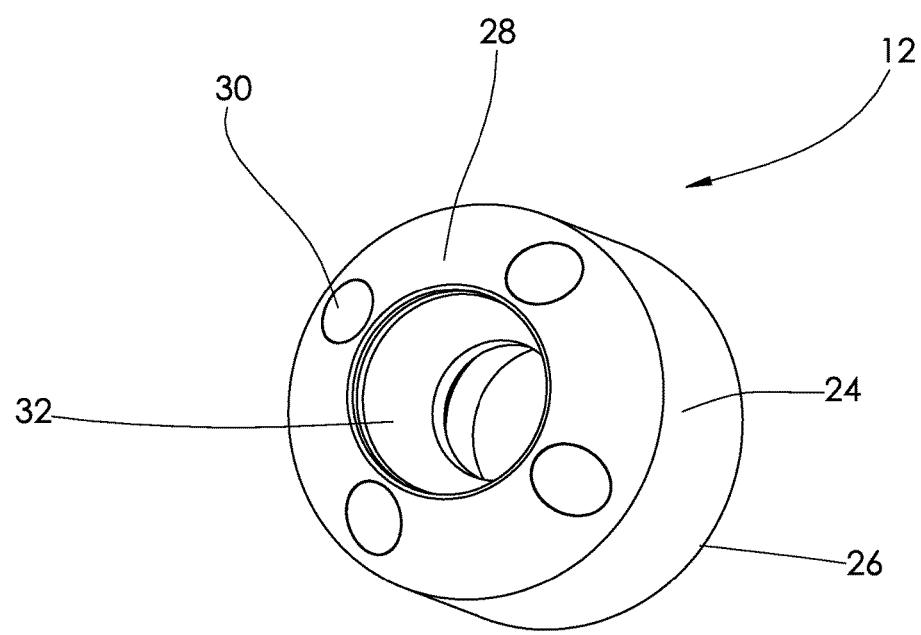
FIG. 3 shows a base member of an adjustable mirror bracket according to one embodiment of the present disclosure.
Figure 4:
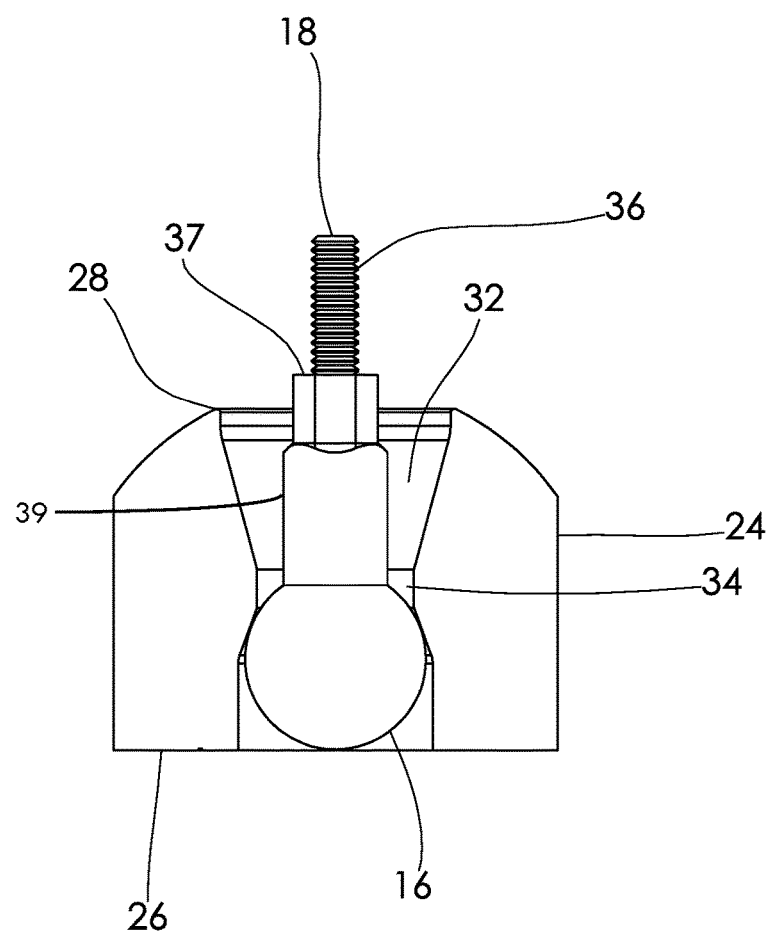
FIG. 4 shows a cross-sectional side view of a base member and spherical bearing according to one embodiment of the present disclosure.

Referring now to FIGS. 3 and 4, the base member 12 is formed of a cylindrical body 24 having a bottom end 26 and a top end 28. The bottom end 26 of the base member 12 is preferably substantially flat, such that the base member 12 may be attached to a surface around or near a dash of a watercraft. The base member 12 may be secured to a watercraft using one or more fasteners extending through one or more mounting holes 30 formed through the cylindrical body 24 of the base member 12 and into a surface of the watercraft. The top end 28 of the body 24 has a hemispherical or rounded shape, as shown in FIG. 4.

The cylindrical body 24 is preferably formed of a solid metal, such as steel or aluminum, however it is also understood that various other suitable materials such as a polymer or composite material may be used. Further, while the above description contemplates a cylindrical body of the base member 12, it is also understood that the body of the base member 12 may be formed into a variety of other shapes.

Figure 5:
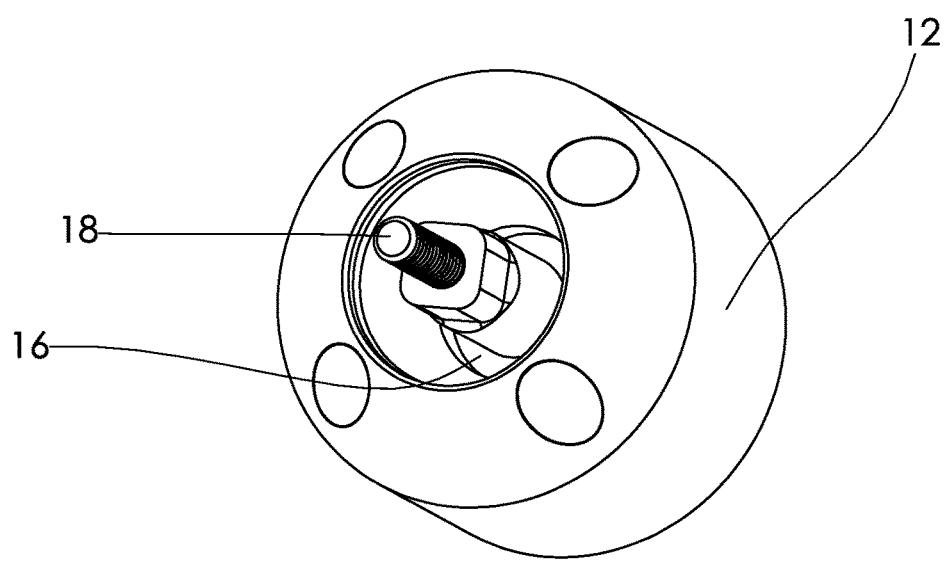
FIG. 5 shows a perspective view of a base member and spherical bearing according to one embodiment of the present disclosure.

A socket 32 is formed within the cylindrical body 24 for engaging the spherical bearing 16 and projecting stud 18, as shown in FIG. 5. Referring to FIG. 4, the socket 32 has a substantially hourglass shape such that a diameter of the socket 32 tapers from a width at the bottom end 26 to a narrower middle portion 34 before again tapering outward to a width at the top end 28 of the cylindrical body 24.

With continued reference to FIG. 4, the socket 32 is shaped to conform to a surface of the spherical bearing 16 such that the spherical bearing 16 may move in relation to the socket 32. The narrower middle portion 34 has a width that is less than a diameter of the spherical bearing 16 to substantially prevent the spherical bearing 16 from moving upward through the base member 12. The stud 18 of the spherical bearing 16 extends substantially upward through the base member 12 and projects from the top end 28 of the base member 12 when the spherical bearing 16 is positioned within the socket 32. The spherical bearing stud 18 preferably includes a threaded portion 36 extending above the top end 28 of the base member 12, and also includes a keyed portion 37 having a rectangular or other shaped cross-sectional area.

The spherical bearing 16 is preferably formed of a molded polymer. The spherical bearing 16 may include a stud body portion 39 that is formed on the spherical bearing 16. The stud body portion 39 is preferably molded with the spherical bearing 16 such that the spherical bearing 16 and study body portion 39 are formed of a single piece. The keyed portion 37 is also preferably molded as part of the study body portion 39 during molding of the spherical bearing 16 and stud body portion 39. The threaded portion 36 is preferably formed of a bolt or other insert made from steel or other suitable metal materials over which the stud body portion 39 and spherical bearing 16 are molded, wherein part of the threaded portion 36 extends from the stud body portion 39. While the spherical bearing 16 is preferably molded with the stud body portion 39 and keyed portion 37, it is also understood that the spherical bearing 16 may be formed of a metal such as steel, aluminum, or other suitable metals, and that the study body portion 39 may be formed separately and attached to the spherical bearing 16.

Figure 6:
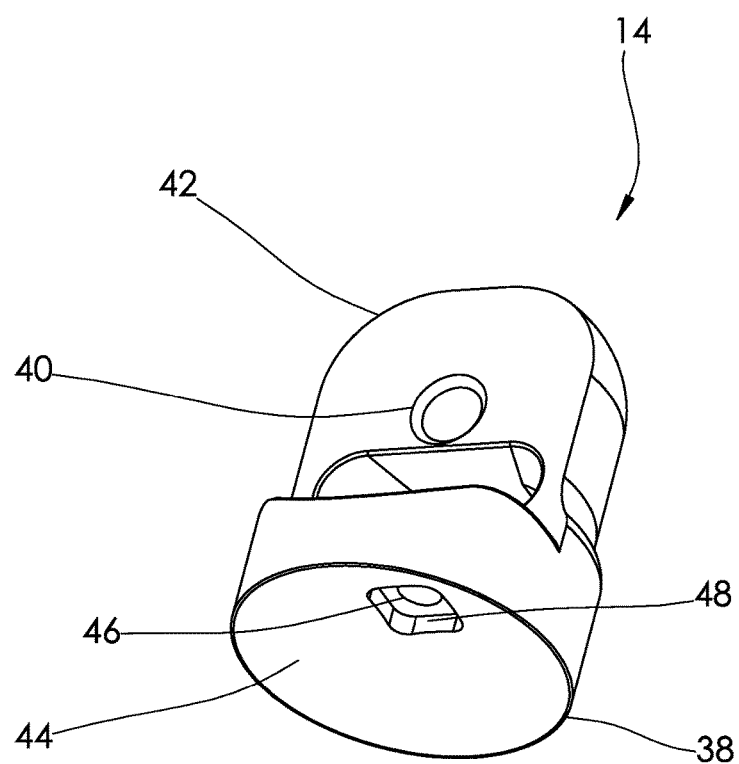
FIGS. 6 and 7 show a pivot member of an adjustable mirror bracket according to one embodiment of the present disclosure.
Figure 7:
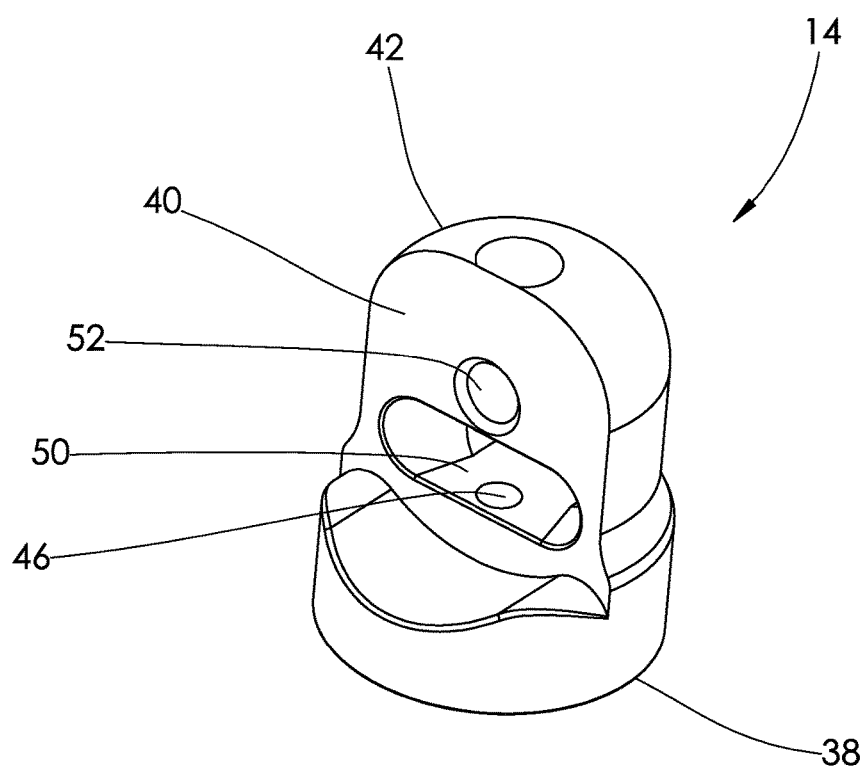

Referring to FIGS. 6 and 7, the pivot member 14 includes a cylindrical bottom end 38 and an attachment surface 40 formed along an upper end 42 of the pivot member. A cupped portion 44 is formed in the bottom end 38 of the pivot member 14, the cupped portion 44 having a shape that substantially conforms to the hemispherical top end 28 of the base member 12. An attachment bore 46 is formed through the cupped portion 44 of the pivot member 14 for receiving the stud 18 of the spherical bearing 16. A keyed recess 48 may also be formed in the bottom end 38 of the pivot member 14 for engaging the keyed portion 37 of the stud 18.

The pivot member 14 includes a body portion having a hemispherical cross-sectional area. The attachment surface 40 is formed along a flat back portion of the body. A cavity 50 is formed in the attachment surface 40 and extends into the body portion of the pivot member. The cavity 50 intersects with the attachment bore 46 such that when the pivot member 14 is engaged with the base member 12, the threaded portion 36 of the stud 18 extends into the cavity 50 of the pivot member 14. A nut or other like fastener is inserted into the cavity 50 and attached to the stud 18 to secure the pivot member 14 to the base member 12. A threaded support arm bore 52 is also formed in the body of the pivot member 14 for receiving a threaded fastener. The pivot member 14 is also preferably formed of a metal such as steel or aluminum, however, it is also understood that the pivot member 14 may be formed of other suitable metallic and non-metallic materials, such as a polymer or composite material.

Figure 8:
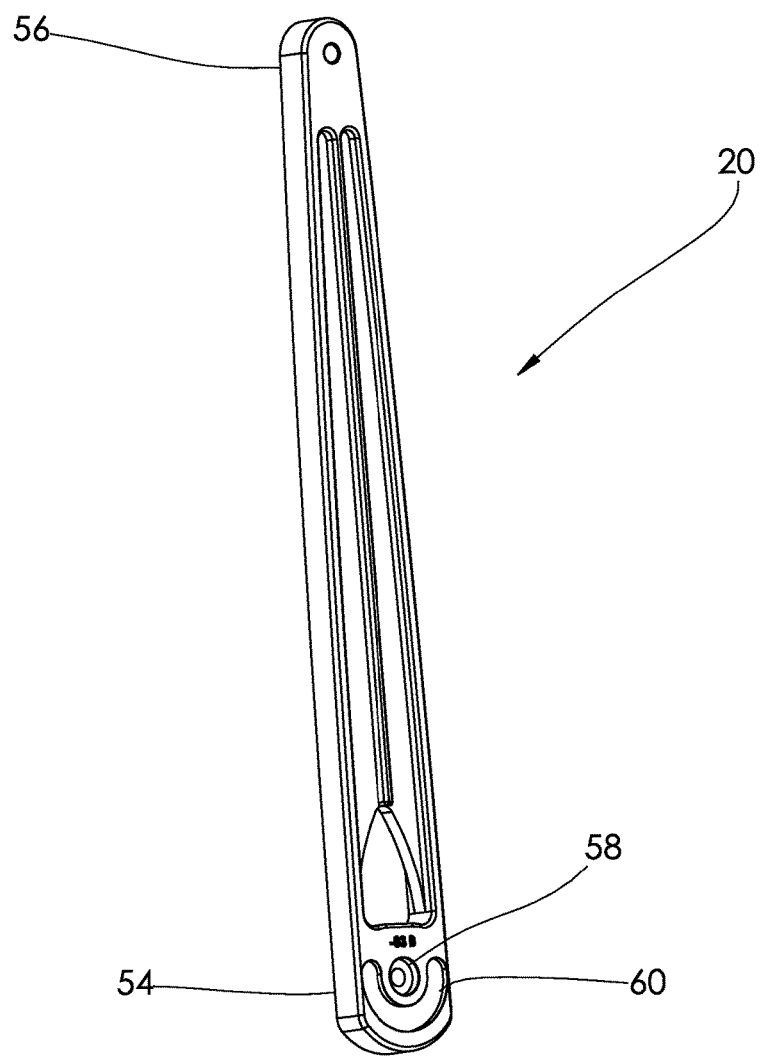
FIG. 8 shows an elongate support arm of an adjustable mirror bracket according to one embodiment of the present disclosure.

The attachment surface 40 provides a substantially flat surface for engaging a surface of the elongate support arm 20. Referring to FIG. 8, the elongate support arm 20 includes a first arm end 54 and a second arm end 56 that is distal from the first arm end. A bore 58 is formed on the first arm end 54 of the support arm 20 and is aligned with the support arm bore 52 of the pivot member 14. A guide track 60 may also be formed towards the first arm end 54 of the support arm 20 for engaging a portion of the pivot member 14 and limiting an angle at which the support arm 20 pivots with respect to the pivot member 14.

Figure 9:
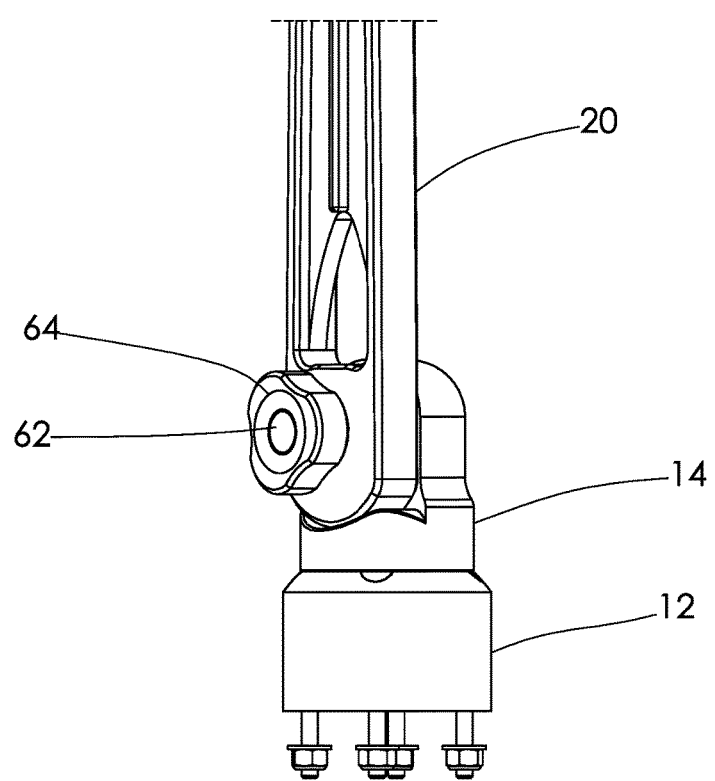
FIG. 9 shows a base member, pivot member, and support arm assembly according to one embodiment of the present disclosure.

The support arm 20 is pivotally attached to the pivot member 14 with a threaded fastener 62, as illustrated in FIG. 9. The threaded fastener 62 includes a knob 64 that allows a user to threadably engage the support arm 20 to the pivot member 14 to prevent rotation of the support arm 20 with respect to the pivot member 14. While the fastener preferably includes a knob 64 or other like surface allowing a user to tighten or loosen the threaded fastener 62, other various fasteners may be used that require a tool for adjustment. Similarly, other suitable fasteners may be provided that allow a user to manually engage or disengage the support arm 20 from the pivot member 14.

In one embodiment, the attachment surface 40 of the pivot member 14 includes a serrated surface or includes raised portions extending from the attachment surface. The support arm 20 also includes a serrated surface or raised portions that corresponds to the serrated surface or raised portions of the attachment surface. The serrated surfaces or raised portions interlock when the threaded fastener 62 is tightened, thereby further preventing the support arm 20 from pivoting with respect to the pivot member 14.

Figure 10:
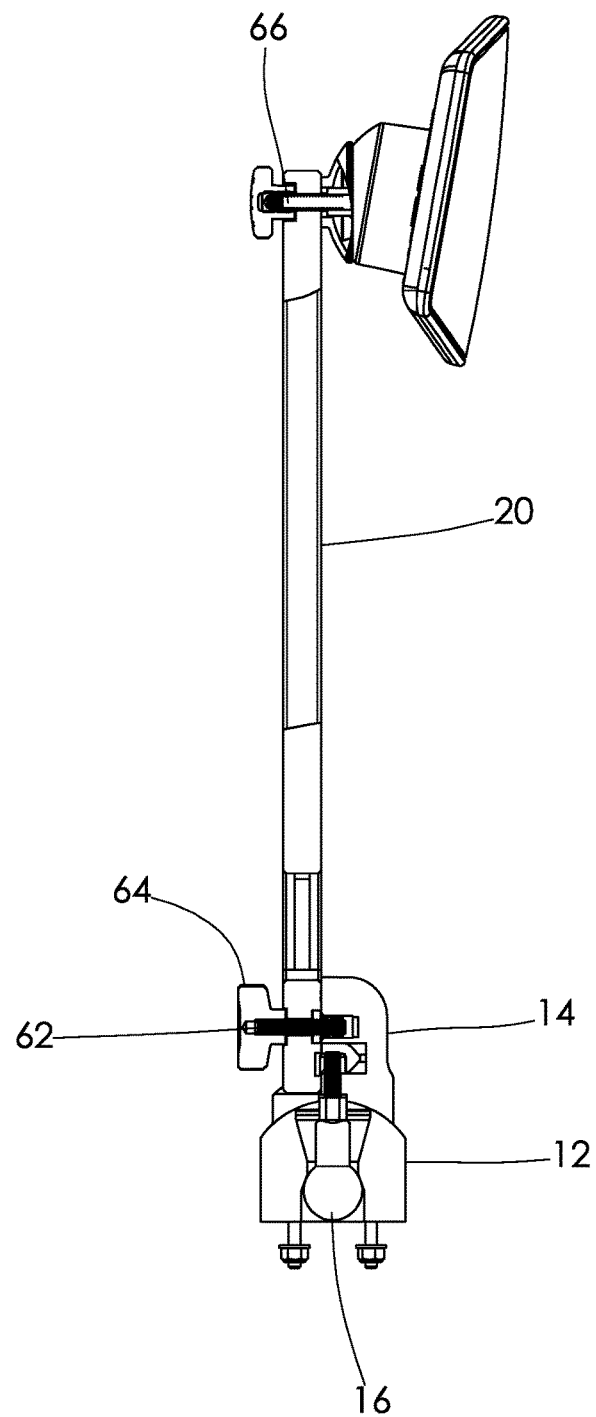
FIG. 10 shows a cross-sectional side view of an adjustable mirror bracket according to one embodiment of the present disclosure.
Figure 11:
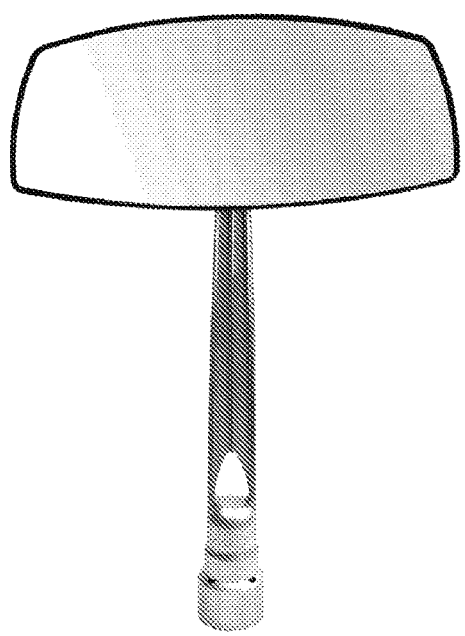
FIGS. 11-16 show an adjustable mirror bracket according to embodiments of the present disclosure.
Figure 12:
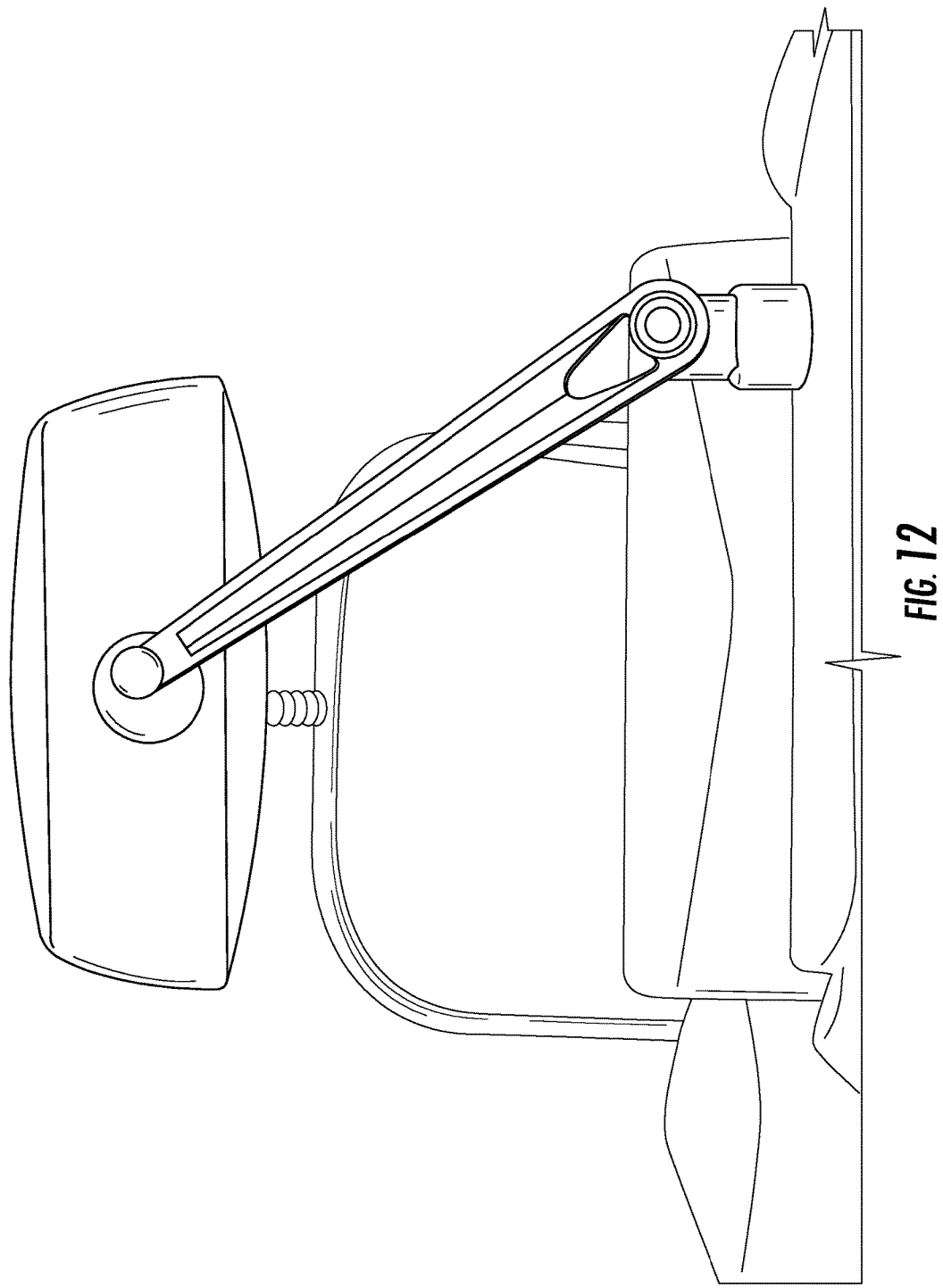
Figure 13:
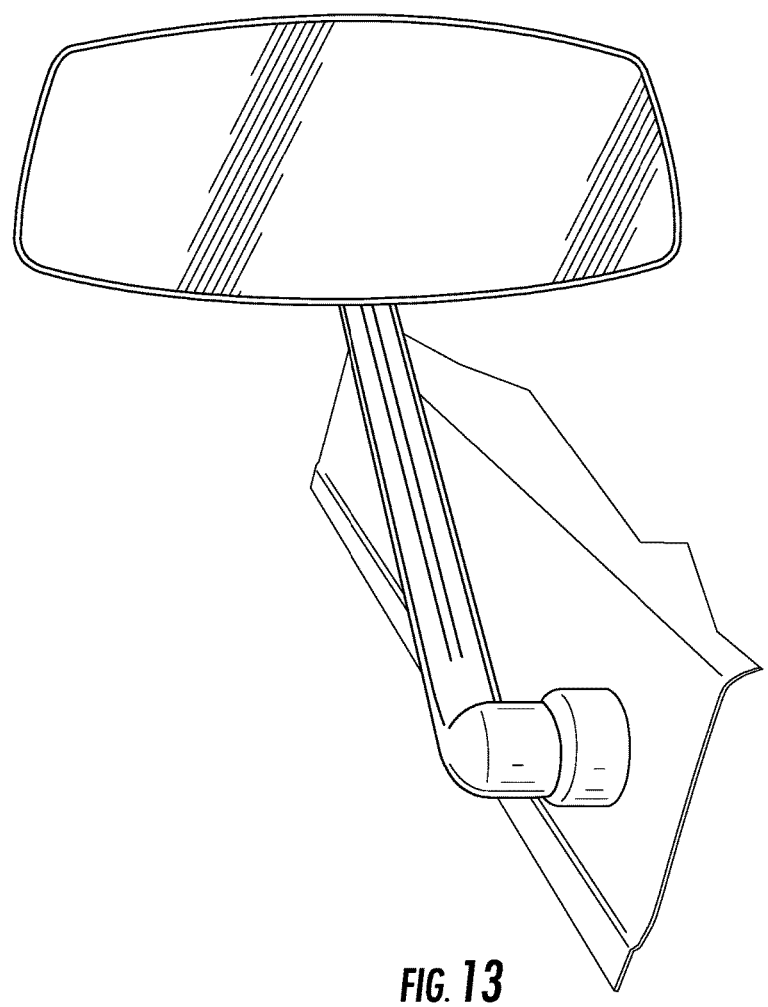
Figure 14:
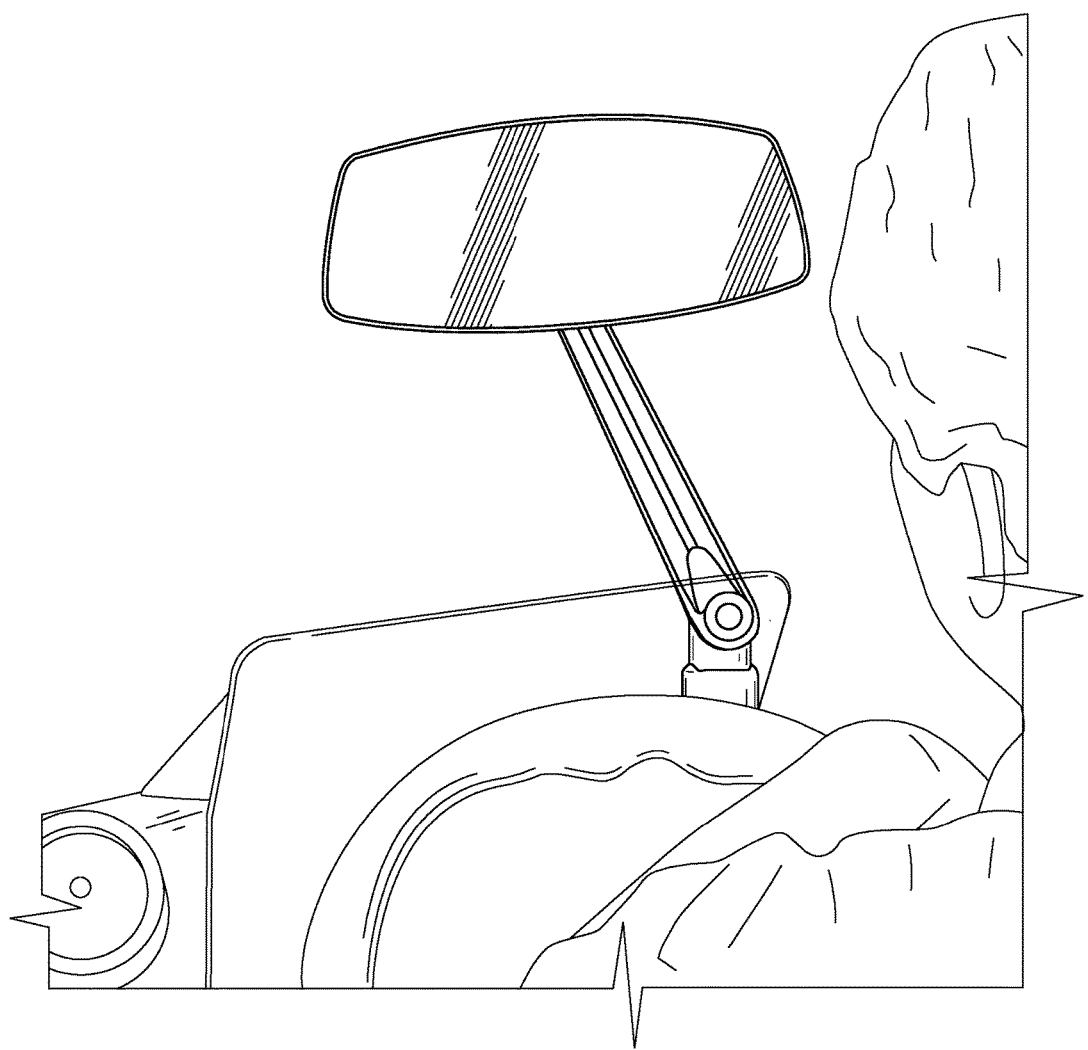
Figure 15:
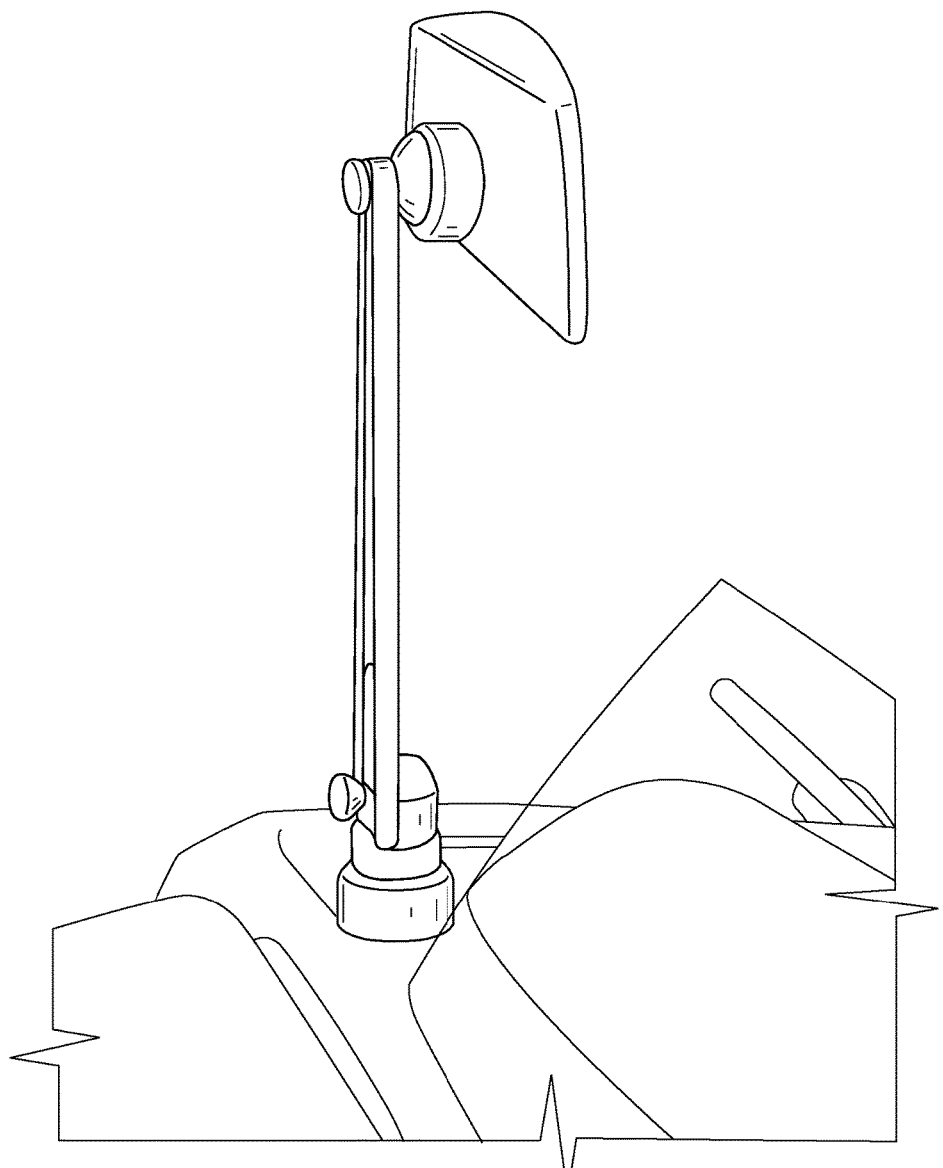
Figure 16:
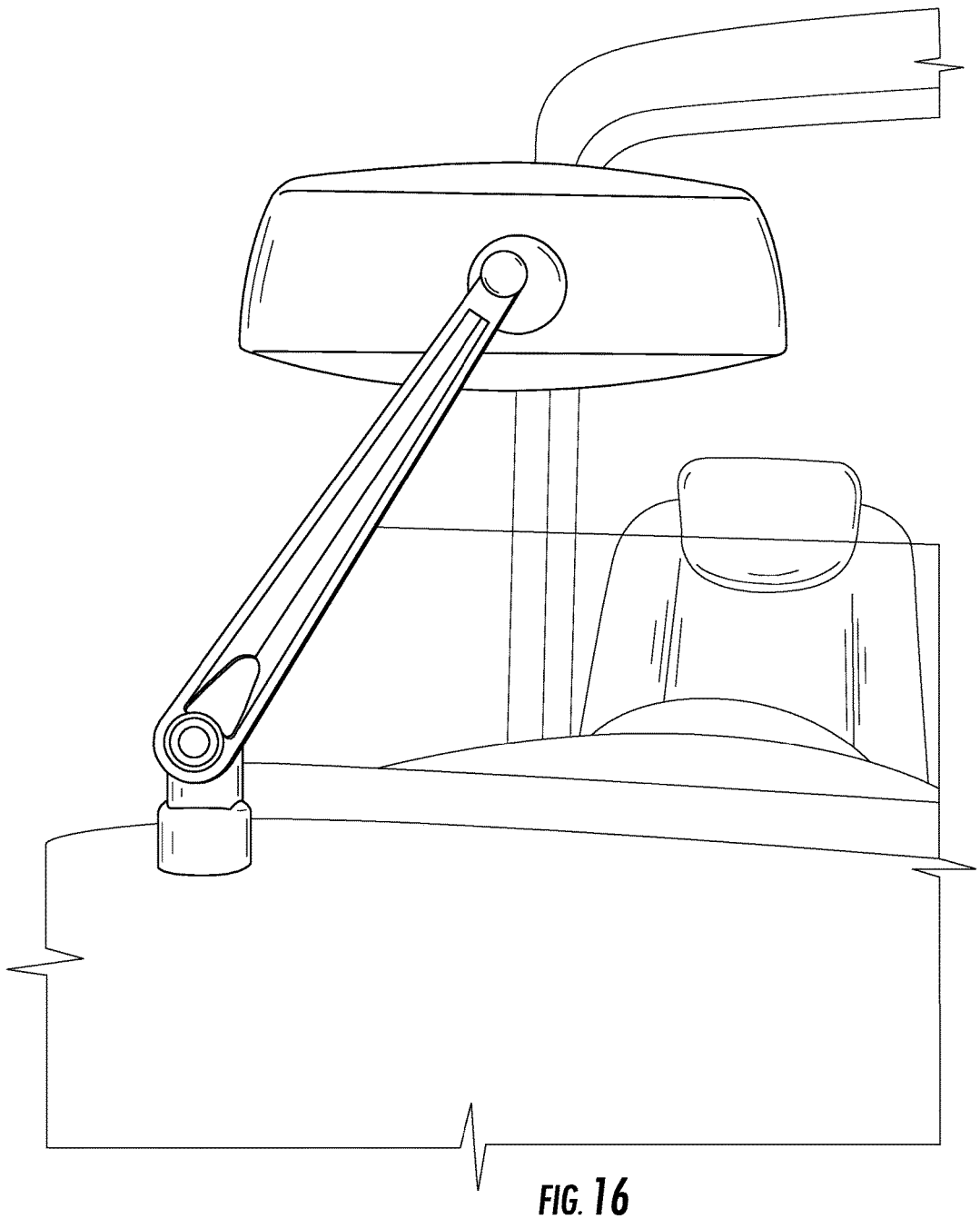
Figure 17:
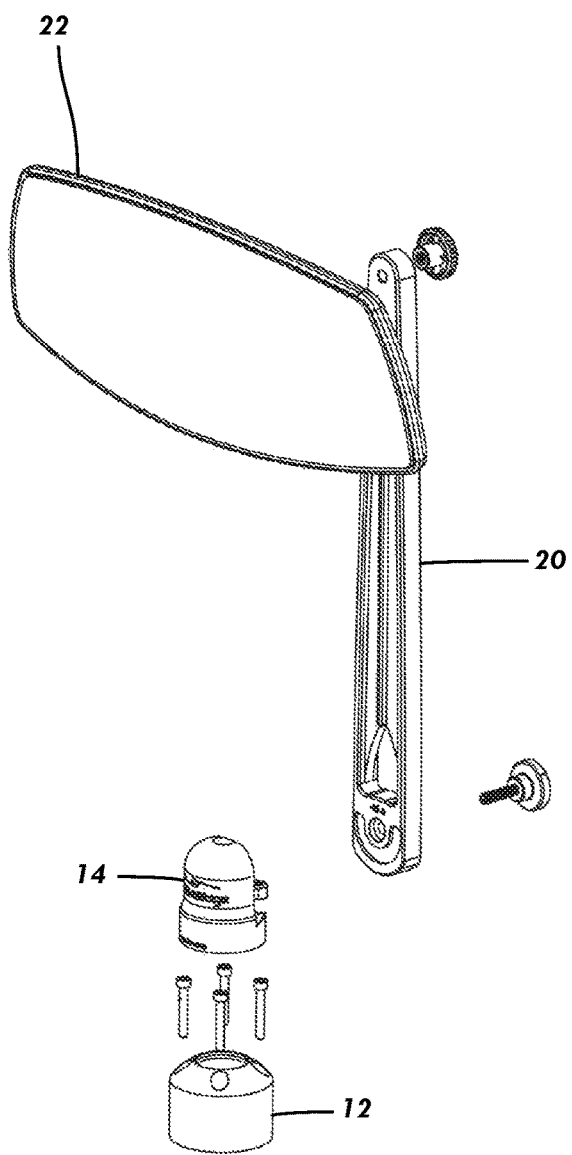
FIG. 17 shows an exploded view of an adjustable mirror bracket according to one embodiment of the present disclosure.

Referring again to FIG. 1 the mirror 22 is pivotally attached to the support arm 20 at the second arm end 56. A suitable mirror is illustrated, for example, in U.S. D712,325. The mirror includes a reflective surface within a field of view of an operator of the watercraft such that the operator is presented a rearward-facing view from the watercraft during operation. As illustrated in FIG. 10, a threaded fastener 66 extends through the second arm end 56 and into a back of the mirror 22 for securing the mirror 22 to the support arm 20. Adjustment of the mirror 22 relative to the support arm 20 is possible using an adjustable pivot or joint between the mirror 22 and support arm 20. In one embodiment the mirror 22 is attached to the support arm 20 with a mirror ball joint that allows the mirror 22 to rotate and pivot along multiple axes. The threaded fastener engages the mirror ball joint such that when the fastener 66 is loosened the mirror 22 is adjustable relative to the support arm 20, and when the fastener 66 is tightened the mirror 22 is maintained in a desired position relative to the support arm.

The adjustable mirror bracket 10 allows a user to position the mirror 22 in a desired position on a watercraft so that an operator of the watercraft has a clear rear-facing view from the watercraft with the mirror 22. In operation, the base member 12 is attached to a surface of the watercraft adjacent a position of the operator. The base member 12 may be attached to a surface such as a dash area of the watercraft. The surface may be oriented in a substantially horizontal or vertical position prior to adjusting a position of the mirror 22 as discussed in detail below. The base member 12 is attached to the surface by inserting one or more fasteners through the one or more mounting holes 30 of the base member 12. The fasteners extend through the mounting holes and into a mounting surface on the watercraft. The fasteners secure the base member 12 to the watercraft using one or more nuts that engage the fasteners extending through the base member 12.

Prior to attaching the base member 12 to a surface of the watercraft, the spherical bearing 16 is disposed within the socket 32 of the base member 12 such that the spherical bearing stud 18 extends from a top portion of the base member 12. The pivot member 14 is placed over the base member 12 such that the spherical bearing stud 18 extends through the attachment bore 46 and into the cavity 50 of the pivot member 14. A nut or other fastener is inserted into the cavity 50 and engages the threaded portion 36 of the stud 18. When the pivot member 14 is secured to the base member 12, the keyed portion 37 of the stud 18 engages the keyed recess 48 of the pivot member 14 such that the pivot member 14 and spherical bearing 16 rotate together.

When a user desires to re-orient the pivot member, the fastener retaining the spherical bearing stud 18 is substantially loosened, thereby allowing the pivot member 14 to move in multiple planes (such as forward/backward and side to side movement) and further allows the pivot member 14 to be rotated with respect to the base member 12. Movement of the pivot member 14 is limited by the stud 18 of the spherical bearing 16 contacting one or more walls of the socket 32 in the base member 12. When the pivot member 14 is in a desired position relative to the base member 12, the nut engaging the spherical bearing stud 18 is tightened, thereby securing the pivot member 14 to the base member 12 in the desired position.

After positioning the pivot member 14 in a desired orientation, the support arm 20 is attached to the pivot member 14 using threaded fastener 62. The threaded fastener 62 extends through the first end 54 of the support arm 20 and into the support arm bore 52 of the pivot member. A user adjusts an angle of the support arm 20 relative to the pivot member 14 until the support arm 20 is in a desired position. After placing the support arm 20 in a desired position, a user tightens the fastener 62 using knob 64, thereby securing the orientation of the support arm 20 with respect to the pivot member 14. When the support arm 20 is attached to the pivot member 14, the first end 54 of the support arm 20 substantially conceals the cavity 50 and fastener placed therein.

After securing the support arm 20, the mirror 22 is attached to the second end 56 of the support arm 20 using threaded fastener 66. An orientation of the mirror 22, which preferably includes a ball joint, is then adjusted such that an operator of the watercraft may obtain an unobstructed rear-facing view from the watercraft. An angle and rotation of the mirror 22 are adjusted until the mirror is in a desired position. The threaded fastener 66 is then tightened to secure the mirror 22 in the desired position.

The adjustable mirror bracket of the present disclosure advantageously enables a user to secure a mirror to a watercraft such that the mirror is supported in a variety of configurations. The user may attach a base of the bracket to an angled surface and orient the pivot member and support arm into a variety of positions depending on where the mirror is needed to provide the operator with a rearward-facing view from the watercraft. FIGS. 11-16 illustrate the adjustable mirror bracket 10 of the present disclosure oriented in various configurations. The adjustable attachment of the pivot member to the base member, support arm to the pivot member, and mirror to the support arm allows an orientation of the mirror to be adjustable in multiple axes relative to a surface on which the bracket is supported.

The mirror bracket of the present disclosure provides substantial adjustability while also providing a stable support for the mirror that prevents movement of the mirror during operation of the watercraft. After the mirror is adjusted into a desired position and fasteners securing the pivot member to the base member and support arm to the pivot member are tightened, the mirror is substantially prevented from moving.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An adjustable mirror bracket for supporting a mirror, the adjustable mirror bracket comprising:
   a base member including
      a body having bottom end, a hemispherical top end, a socket formed in the body of the base member, and an aperture formed through the hemispherical top end into the socket formed in the body of the base member;
      a spherical bearing including a stud projecting therefrom, the spherical bearing located within the socket of the lower base member and oriented such that the stud extends through the aperture formed through the hemispherical top end of the base member and upwardly from the hemispherical top end of the body;
   a pivot member including
      a cupped lower surface shaped to conform to and contact the hemispherical top end of the base member, the cupped lower surface forming a ball and socket fit between the pivot member and the base member;
      a bore formed through the cupped lower end for receiving the stud of the spherical bearing, the bore aligned with the aperture formed through the hemispherical top end ; and
      an attachment surface area formed in an upper end of the pivot member;
   an elongate support arm pivotally attached to the pivot member, the elongate support arm having a first end and a second end, wherein the elongate support arm is pivotally attached with a fastener to the attachment surface of the pivot member at the first end of the support arm;
   wherein the pivot member is located between the hemispherical top end of the base member and the elongate support arm; and
   wherein the pivot member is movably associated such that the pivot member and pivotally attached elongate support arm are movable along multiple planes relative to the base member.

2. The adjustable mirror bracket of claim 1, further comprising a cavity formed through the attachment surface area of the pivot member in communication with the bore formed through the cupped lower end of the pivot member, wherein the spherical bearing stud extends into the cavity.

3. The adjustable mirror bracket of claim 2, wherein the stud of the spherical bearing includes a keyed portion formed thereon, and wherein the pivot member includes a keyed recess formed on the cupped lower end for engaging the keyed portion of the stud.

4. The adjustable mirror bracket of claim 2, wherein the spherical bearing stud is threaded, and further comprising a nut inserted into the cavity for securing the pivot member to the base member in a desired orientation.

5. The adjustable mirror bracket of claim 2, wherein when the support arm is attached to the attachment surface of the pivot member, the first end of the support arm substantially conceals the cavity formed in the attachment surface of the pivot member.

6. The adjustable mirror bracket of claim 1, wherein the attachment surface and a surface of the first end of the support arm are serrated to substantially prevent the support arm from pivoting with respect to the pivot member.

7. The adjustable mirror bracket of claim 1, further comprising a mirror attached to the second end of the elongate support arm.

8. The adjustable mirror of claim 7, wherein the mirror is attached to the second end of the elongate support arm with a ball joint.

9. The adjustable mirror of claim 1, further comprising one or more mounting holes formed through the base member for securing the base member to a support surface.

10. The adjustable mirror of claim 1, wherein corresponding surfaces of the attachment surface of the pivot member and elongate support arm are serrated for substantially preventing rotation of the support arm relative to the pivot member when fastener of the support arm is substantially tightened.

11. The adjustable mirror bracket of claim 1, wherein the pivot member has a hemispherical cross-sectional area, and wherein the attachment surface is formed along a flat back portion of the hemispherical pivot member.

12. An adjustable mirror bracket for supporting a mirror, the adjustable mirror bracket comprising:
- a base member including
  - a body having bottom end, a hemispherical top end, a socket formed in the body of the base member, and an aperture formed through the hemispherical top end into the socket formed in the body of the base member;
  - a spherical bearing including a stud projecting therefrom, the spherical bearing located within the socket of the lower base member and oriented such that the stud extends through the aperture formed through the hemispherical top end of the base member and upwardly from the hemispherical top end of the body;
- a pivot member including
  - a cupped lower surface shaped to conform to and contact the hemispherical top end of the base member, the cupped lower surface forming a ball and socket fit between the pivot member and the base member;
  - a bore formed through the cupped lower end for receiving the stud of the spherical bearing, the bore aligned with the aperture formed through the hemispherical top end; and
  - an attachment surface area formed in an upper end of the pivot member; and
  - a cavity formed through the attachment surface area of the pivot member in communication with the bore formed through the cupped lower end of the pivot member, wherein the spherical bearing stud extends into the cavity;
- an elongate support arm pivotally attached to the pivot member, the elongate support arm having a first end and a second end, wherein the elongate support arm is pivotally attached with a fastener to the attachment surface of the pivot member at the first end of the support arm;
- wherein the pivot member is located between the hemispherical top end of the base member and the elongate support arm; and
- wherein the pivot member is movably associated such that the pivot member and pivotally attached elongate support arm are movable along multiple planes relative to the base member.

13. An adjustable mirror bracket for supporting a mirror, the adjustable mirror bracket comprising:
- a base member including
  - a body having bottom end, a hemispherical top end, a socket formed in the body of the base member, and an aperture formed through the hemispherical top end into the socket formed in the body of the base member;
  - a spherical bearing including a stud projecting therefrom, the spherical bearing located within the socket of the lower base member and oriented such that the stud extends through the aperture formed through the hemispherical top end of the base member and upwardly from the hemispherical top end of the body;
- a pivot member including
  - a cupped lower surface shaped to conform to and contact the hemispherical top end of the base member, the cupped lower surface forming a ball and socket fit between the pivot member and the base member, the lower end including a keyed recess formed on the cupped lower end for engaging the keyed portion of the stud;
  - a bore formed through the cupped lower end for receiving the stud of the spherical bearing, the bore aligned with the aperture formed through the hemispherical top end;
  - an attachment surface area formed in an upper end of the pivot member; and
  - a cavity formed through the attachment surface area of the pivot member in communication with the bore formed through the cupped lower end of the pivot member, wherein the spherical bearing stud extends into the cavity;
- an elongate support arm pivotally attached to the pivot member, the elongate support arm having a first end and a second end, wherein the elongate support arm is pivotally attached with a fastener to the attachment surface of the pivot member at the first end of the support arm; and
- a mirror pivotally attached to the second end of the elongate support arm;
- wherein the pivot member is located between the hemispherical top end of the base member and the elongate support arm; and
- wherein the pivot member is movably associated such that the pivot member and pivotally attached elongate support arm are movable along multiple planes relative to the base member.

\* \* \* \* \*